(12) United States Patent
Cunningham et al.

(10) Patent No.: US 7,801,882 B2
(45) Date of Patent: Sep. 21, 2010

(54) OPTIMIZED CONSTRAINT AND INDEX MAINTENANCE FOR NON UPDATING UPDATES

(75) Inventors: Conor J. Cunningham, Redmond, WA (US); Stefano Stefani, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 10/957,409

(22) Filed: Oct. 1, 2004

(65) Prior Publication Data
US 2006/0074965 A1 Apr. 6, 2006

(51) Int. Cl.
G06F 7/00 (2006.01)
G06F 17/30 (2006.01)

(52) U.S. Cl. .................................. 707/713

(58) Field of Classification Search ............. 707/3, 707/102, 2, 202, 718, 713
See application file for complete search history.

(56) References Cited

U.S. PATENT DOCUMENTS

| | | | | |
|---|---|---|---|---|
| 5,963,959 | A * | 10/1999 | Sun et al. | 707/200 |
| 6,122,644 | A * | 9/2000 | Graefe et al. | 707/202 |
| 6,363,387 | B1 * | 3/2002 | Ponnekanti et al. | 707/10 |
| 6,564,203 | B1 * | 5/2003 | Krishnaprasad et al. | 707/2 |
| 6,598,041 | B1 * | 7/2003 | Bernal et al. | 707/3 |
| 6,763,358 | B2 * | 7/2004 | Anderson et al. | 707/102 |
| 7,653,665 | B1 * | 1/2010 | Stefani et al. | 709/203 |
| 2006/0015490 | A1 * | 1/2006 | Denuit et al. | 707/4 |
| 2006/0085464 | A1 * | 4/2006 | Beuch et al. | 707/101 |

OTHER PUBLICATIONS

Liu, Jixue, et al., "Implementation and Performance Analysis of Incremental Equations for Nested Relations," 2000, IEEE, pp. 398-404.*

Dalian Quass, Jennifer Widom, "On-Line Warehouse View Maintenance," 1997 ACM, pp. 393-404.*

Ellis, Clarence A., "Consistency and Correctness of Duplicate Database Systems," *Proceedings of the sixth ACM symposium on operating systems principles*, Nov. 1977, pp. 67-84.

Kamath, Mohan, et al., "Efficient Transaction Support for Dynamic Information Retrieval Systems," *Proceedings of the $19_{th}$ annual international ACM SIGIR conference on research and development in information retrieval*, Aug. 1996, pp. 147-155.

Naqvi, Shamim, et al., "Database Updates in Logic Programming," *Proceedings of the seventh ACM SIGACT-SIGMOD-SIGART symposium on principles of database systems*, Mar. 1988, pp. 251-262.

(Continued)

*Primary Examiner*—John R. Cottingham
*Assistant Examiner*—Hexing Liu
(74) *Attorney, Agent, or Firm*—Woodcock Washburn LLP (57) ABSTRACT

Database management systems allow modification of existing table rows through update statements or other data modification commands. For example, a user may specify, via a command statement, the table to update, the columns to modify and their respective new value(s), and qualify the rows to be updated. Optimized constraint and index maintenance for data modification statements and commands is provided where the new value being assigned to the columns is actually the same as the current value, e.g., update commands that actually leave the columns unchanged.

29 Claims, 8 Drawing Sheets

OTHER PUBLICATIONS

Quass, Dallan, et al., "On-Line Warehouse View Maintenance," *ACM SIGMOD Record, Proceedings of the 19997 ACM SIGMOD international conference on management of data*, vol. 26, Issue 2, Jun. 1997, pp. 393-404.

Wong, E., et al., "Distributing a Database for Parallelism," *ACM SIGMOD Record, Proceedings of the 1983 ACM SIGMOD international conference on management of data*, vol. 13, Issue 4, May 1983, pp. 23-29.

* cited by examiner

OPTIMIZED CONSTRAINT AND INDEX MAINTENANCE FOR NON UPDATING UPDATES

FIELD OF THE INVENTION

The present invention relates generally to the field of information storage and retrieval, and, more particularly, to query optimization and management.

BACKGROUND OF THE INVENTION

Traditional approaches to the organization of information in computer systems have centered on the use of file-folder-and-directory-based systems ("file systems") to organize files into directory hierarchies of folders based on an abstraction of the physical organization of the storage medium used to store the files. Typically, storable data has been organized into files, folders, and directories at the operating system level. These files generally include the file hierarchy itself (the "directory") embodied in a special file maintained by the file system. This directory, in turn, maintains a list of entries corresponding to all of the other files in the directory and the nodal location of such files in the hierarchy (herein referred to as the folders). Such has been the state of the art for approximately forty years.

However, while providing a reasonable representation of information residing in the computer's physical storage system, a file system is nevertheless an abstraction of that physical storage system, and therefore utilization of the files requires a level of interpretation between what the user manipulates (units having context, features, and relationships to other units) and what the operating system provides (files, folders, and directories). Consequently, users (applications and/or end-users) have no choice but to force units of information into a file system structure even when doing so is inefficient, inconsistent, or otherwise undesirable. Because most existing file systems utilize a nested folder metaphor for organizing files and folders, as the number of files increases, the effort necessary to maintain an organization scheme that is flexible and efficient becomes quite daunting.

Several unsuccessful attempts to address the shortcomings of file systems have been made in the past. Some of these previous attempts have involved the use of content addressable memory to provide a mechanism whereby data could be accessed by content rather than by physical address. However, these efforts have proven unsuccessful because, while content addressable memory has proven useful for small-scale use by devices such as caches and memory management units, large-scale use for devices such as physical storage media has not yet been possible for a variety of reasons, and thus such a solution simply does not exist. Other attempts using object-oriented database (OODB) systems have been made, but these attempts, while featuring strong database characteristics and good non-file representations, were not effective in handling file representations and could not replicate the speed, efficiency, and simplicity of the file-and-folder-based hierarchical structure at the hardware/software interface system level.

Newly developed storage systems, such as "WinFS" (described further below) store the directory of the files as table(s) in a database. Each file is represented by a row in a base table, and file system operations, such as "enumerate all files in a directory", are satisfied using queries against the database engine. Thus, efficiently performing basic operations against the store involves efficiently optimizing database queries.

In such storage systems, the concept of a file is extended to that of an "object". Metadata about the file is stored in a managed CLR (common language runtime) object with a schema (defined in the storage system) to represent the allowable descriptive data for that object. For example, a picture would have a representative CLR object that would store data such as its resolution, time it was taken, and location information.

In these newly developed storage systems, such as WinFS, the exposed schemas are mapped to tables through a translation layer. Users only see a series of views of the data instead of operating on the base tables. While the exact design of this mapping is not significant, it serves as the glue between the WinFS API and the underlying storage format. Users do not control or see this mapping directly.

The WinFS store also exposes the concept of querying objects based on their type, as opposed to their file name as in earlier conventional file systems. Type-based queries can search for an exact type or any type that derives from a given type. This latter form is called hierarchical matching, and it is expected to be a common WinFS operation. WinFS also supports searching by file.

WinFS's schema model poses some new challenges to the query processor. User-defined types, or UDTs, are used extensively, and it is common to retrieve all UDTs from a table based on the UDT type. Furthermore, WinFS uses UDT inheritance, and it is also a requirement to retrieve all elements of a given type and also any subtype from a table. Multiple tables exist, each containing a different number of UDTs, types, type topology, and UDT distribution within that topology. Additionally, searching operations may go beyond those operations seen in traditional relational database systems to include, for example, searching of XML documents or performing searches over all fields in an object. These properties make it difficult to make accurate cardinality and cost estimates, and also make it difficult to efficiently retrieve values based on type/subtype hierarchy.

Materialized views (also referred to herein as indexed views) have been a subject of database research for over a decade. The basic idea is to materialize, or store, the result of some query, then use such computed result when similar queries are submitted to the database. For example, it may be desirable to store the result of sales per day, for example, and use the result (this materialized view) in the future to answer several related queries, such as sales in a given month or total sales in the year.

For additional flexibility, applications should not need to be aware that certain views exist, or are materialized. The query processor should identify matches between user queries and existing pre-computed results (materialized views), and use such results when applicable.

Materialized views are similar to indices, in that they should be part of the physical design of the database and their primary purpose is to improve performance. The logical design of the database, and correctness of applications should be independent of the presence or absence of materialized views. As with indices, materialized views can introduce dramatic improvements in query performance.

Figure 1:
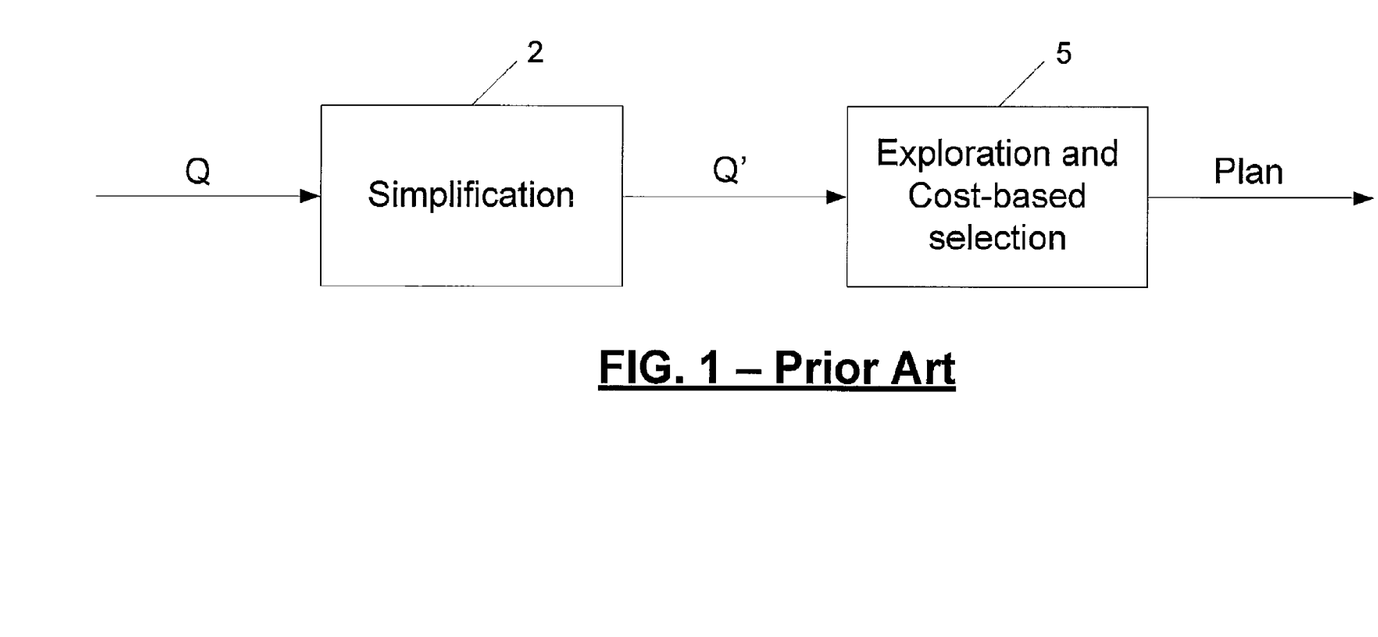
FIG. 1 is a block diagram of a conventional query optimizer.

Query optimizers are normally structured such that there is an initial simplification stage, followed by exploration of alternatives and cost-based selection of an execution plan, as shown in FIG. 1.

During the simplification/normalization stage 2, some changes are made on the original query Q, such as pushing selections down, or rewriting a subquery as a join, when possible. These modifications are aimed at obtaining a "better" query. Typically, there is no detailed cost estimation at this stage, and a single "better" query Q' is produced as the result.

The second stage 5 (exploration and cost-based selection) in optimization is directed to generating multiple alternatives, and using a detailed cost model to select the alternative with the cheapest estimated execution cost. Two conventional architectures for the exploration stage are bottom-up, dynamic programming join enumeration, and transformation-driven generation of alternatives. Both architectures set up a table of alternatives, as is well known, which compactly encodes the various possibilities for each sub-expression of a query.

The SQL query language provides a user with the ability to query (and modify) tabular data stored using the relational data model. The relational data model dictates that each cell in a table (a column of a row) is a single scalar (or atomic) value. The structured query language (SQL) is an American National Standards Institute (ANSI) standard used to communicate with a relational database. SQL statements are used to perform tasks such as update data or retrieve data from a relational database. Although many database systems use SQL, many of them also have their own additional proprietary extensions that are usually only used on their system. However, the standard SQL commands such as "Select", "Insert", "Update", "Delete", "Create", and "Drop" can be used to accomplish many things that one desires to do with a relational database and are believed to be well known to those skilled in the database art.

The SQL Server database management system (DBMS) supports secondary indexes and indexed views built over tables, to speed up certain kinds of data retrieval operations. A secondary index is a data structure organized like a tree, which contains a subset of the columns belonging to the table. An indexed view is the pre-computed result of a query stored into a derived table, which can have secondary indexes as well. Secondary indexes and indexed views are referred to as data structures dependent on the table. Other kinds of dependent objects exist, such as constraints.

When an Insert, Update, or Delete statement is processed, the DBMS has to propagate the change from the table to the dependent structures, so that they are always kept consistent which each other. This allows subsequent data retrieval queries to return the same data independently on whether they access the table, a secondary index, or an indexed view. Thus, whenever modifications are made to the table, they must be made to the secondary indexes and indexed views, as well. The cost of making changes is proportional to the number of places where the change has to be made. While Insert and Delete operations need to be propagated to all the secondary indexes and indexed views, Update statement processing is conventionally optimized to propagate the change only to the data structures that carry columns being modified by the statement. For example, if a secondary index only contains the column C1 of a table T, an update to the C2 column will not be propagated to the index, because its content will be unchanged.

Both secondary indexes and indexed views can be built in SQL Server over both regular table columns and scalar expressions over table columns. For example, it is possible to build a secondary index over the sum of the C1 and C2 columns. Conventionally, whenever an Update statement affects one or more of the columns participating in a scalar expression, the expression will be assumed to be changing, and the change will be propagated to all the dependent data structures that carry this expression.

However, many Update statements do not actually change column values. It is typical for many Update statements to not actually change the value for all the columns, but only for a few of them. Such "non-updating" updates lead to poor performance.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

Database management systems allow modification of existing table rows through update statements or other data modification commands. For example, a user may specify, via an update statement, the table to update, the columns to modify and their respective new value(s), and qualify the rows to be updated. Optimized constraint and index maintenance for data modification statements and commands is provided where the new value being assigned to the columns is actually the same as the current value, e.g., update commands that actually leave some or all of the columns unchanged.

Exemplary embodiments include methods and systems of processing a data modification statement, such as an update command. A data modification statement is received, and it is determined which fields of a data structure are affected by the data modification statement. The data structure is updated in response to the fields of the data structure that are affected by the data modification statement.

According to aspects of the invention, the data structure may comprise a base table, and the fields may comprise columns of the base table. Dependent object maintenance may be performed after the data structure is updated. A dependent object may be a constraint, an indexed view, or an index, for example.

According to further aspects of the invention, a flag may be set for each field, where the flag indicates whether the field is affected by the data modification statement.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Exemplary Computing Environment

Figure 2:
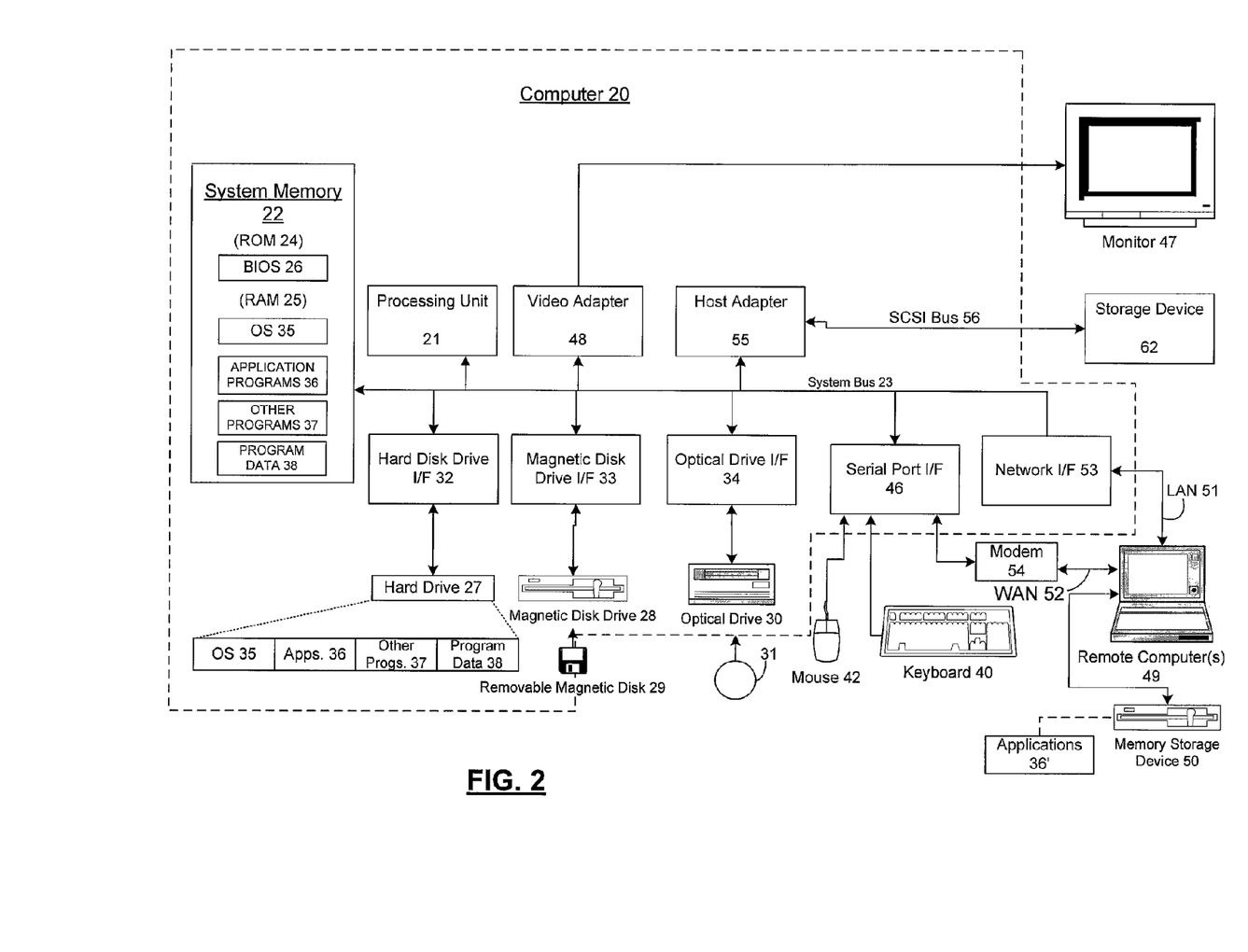
FIG. 2 is a block diagram representing a computer system in which aspects of the present invention may be incorporated.

Numerous embodiments of the present invention may execute on a computer. FIG. 2 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types.

An "object" is a unit of storable information accessible to a hardware/software interface system that has a basic set of properties that are commonly supported across all objects exposed to an end-user by the hardware/software interface system shell. Objects also have properties and relationships that are commonly supported across all types including features that allow new properties and relationships to be introduced. A complex structured type consists of a set of fields, properties, and methods. Each field or property can be one of a scalar type, a complex structure type itself, or of a multiset in which each element is a complex structured type.

Those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk drive 27, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42, such as a mouse. Other input devices (not shown) may include a microphone, joystick, game pad, satellite disk, scanner or the like. These and other input devices are often connected to the processing unit 21 through a serial port interface 46 that is coupled to the system bus 23, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 2 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Figure 3:
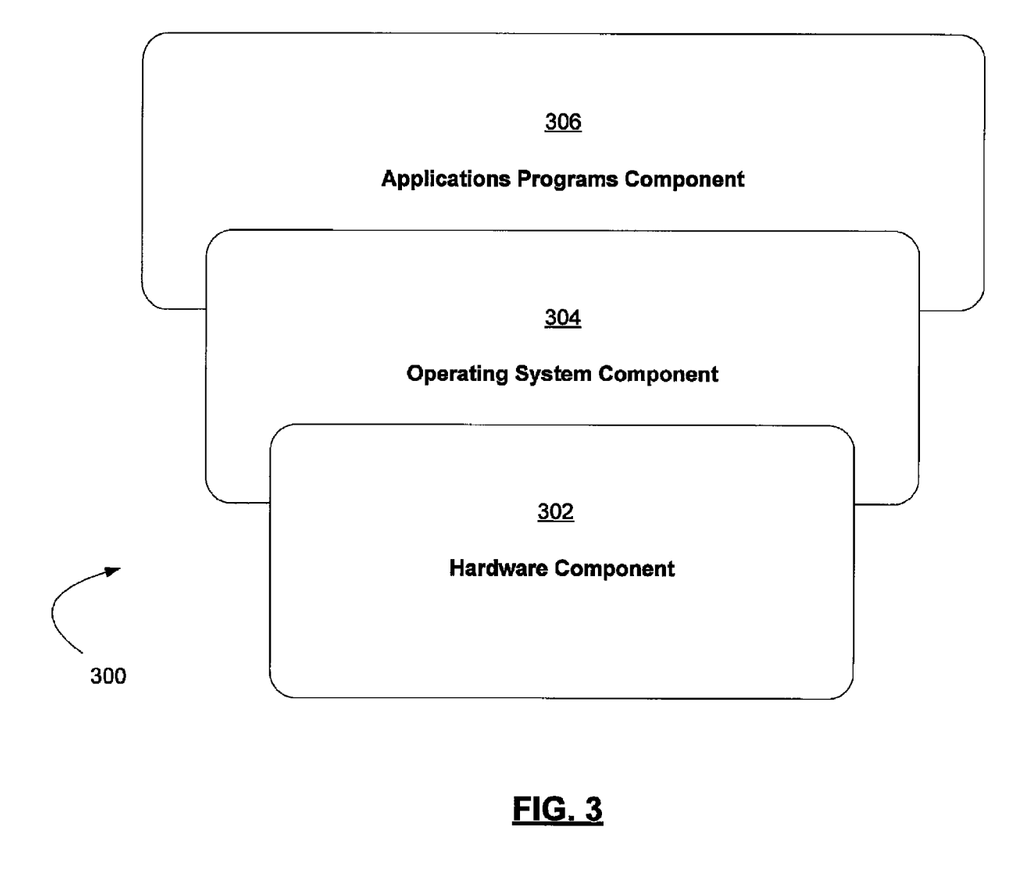
FIG. 3 is a block diagram illustrating a computer system divided into three component groups: the hardware component, the operating system component, and the applications programs component.

As illustrated in the block diagram of FIG. 3, a computer system 300 can be roughly divided into three component groups: the hardware component 302, the operating system component 304, and the applications programs component 306.

In certain computer systems 300, and referring back to FIG. 2, the hardware 302 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 302 comprises the basic resources for the computer system 300.

The applications programs component 306 comprises various software programs including but not limited to compilers, database systems, word processors, business programs, videogames, and so forth. Application programs provide the means by which computer resources are utilized to solve problems, provide solutions, and process data for various users (e.g., machines, other computer systems, and/or end-users).

The operating system component 304 comprises the operating system itself and its shell and kernel. An operating system (OS) is a special program that acts as an intermediary between application programs and computer hardware, and the purpose of an operating system is to provide an environment in which a user can execute application programs. The goal of any operating system is to make the computer system convenient to use, as well as utilize the computer hardware in an efficient manner.

The operating system is generally loaded into a computer system at startup and thereafter manages all of the application programs (or simply "applications") in the computer system. The application programs interact with the operating system by requesting services via an application program interface (API). Some application programs enable end-users to interact with the operating system via a user interface such as a command language or a graphical user interface (GUI).

An operating system traditionally performs a variety of services for applications. In a multitasking operating system where multiple programs may be running at the same time, the operating system determines which applications should run in what order and how much time should be allowed for each application before switching to another application for a turn. The operating system also manages the sharing of internal memory among multiple applications, and handles input and output to and from attached hardware devices. The operating system also sends messages to each application (and, in certain cases, to the end-user) regarding the status of operations and any errors that may have occurred.

An operating system's shell is the interactive end-user interface to an operating system. A shell is the outer layer of an operating system that is directly accessible by application programs and even directly by end-users. In contrast to a shell, the kernel is an operating system's innermost layer that interacts directly with the hardware components.

As well understood by those of skill in the relevant art, "files" are entities of information (including but not limited to the operating system itself, as well as application programs, data sets, and so forth) that are capable of being manipulated as discrete (storable and retrievable) entities by an operating system. In modern operating systems, files are the basic units of storable information (e.g., data, programs, and so forth) that are manipulated by the operating system, and groups of files are organized in "folders".

Figure 4:
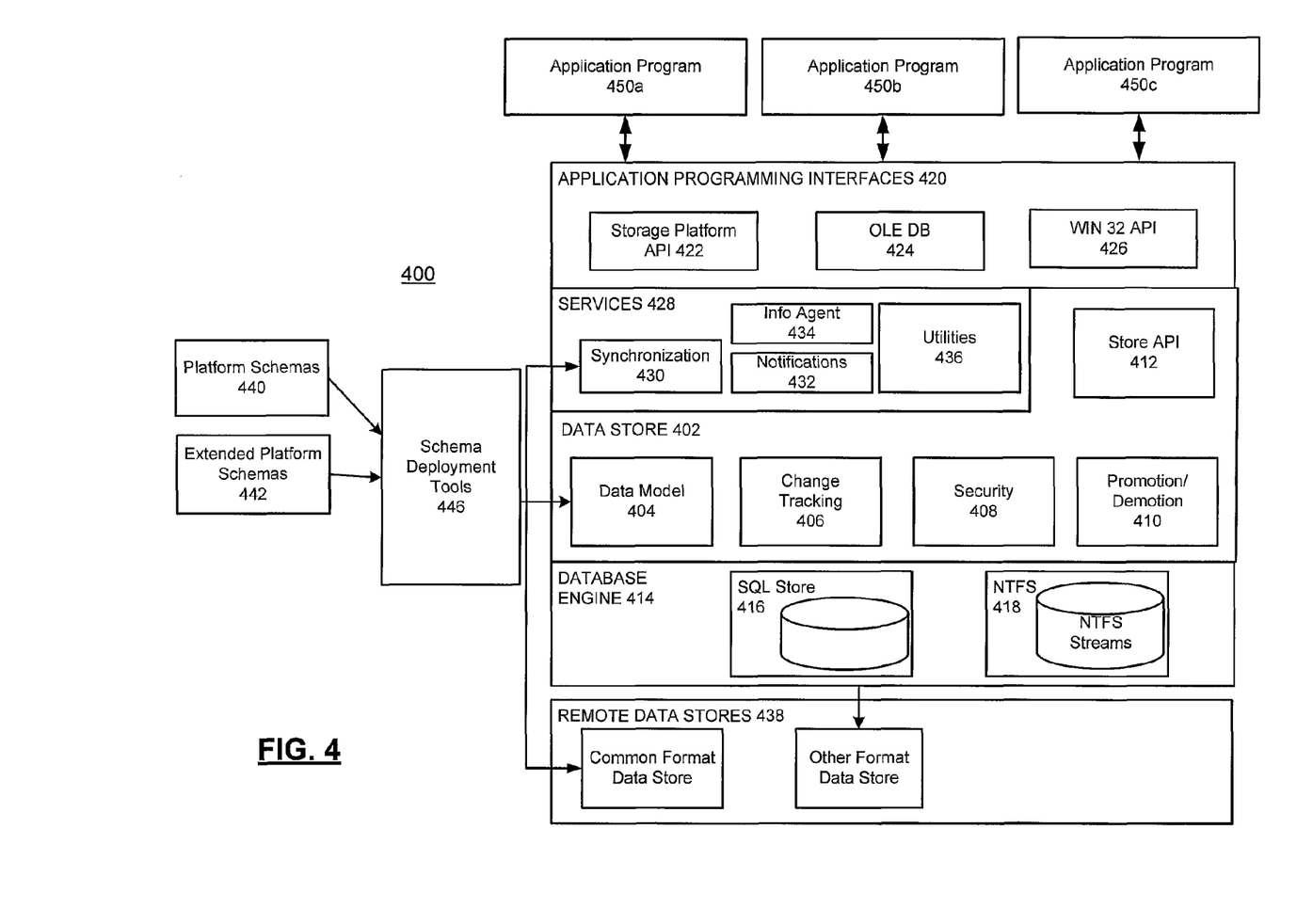
FIG. 4 illustrates an exemplary storage platform that can be used with the present invention.

A storage platform 400 for organizing, searching, and sharing data that can be used with the present invention is designed to be the store for all types of data. Referring to FIG. 4, a storage platform 400 in accordance with the present invention comprises a data store 402 implemented on a database engine 414. In one embodiment, the database engine comprises a relational database engine with object relational extensions. In one embodiment, the relational database engine 414 comprises the Microsoft SQL Server relational database engine.

The data store 402 implements a data model 404 that supports the organization, searching, sharing, synchronization, and security of data. Specific types of data are described in schemas, such as schemas 440, 442 and the storage platform 400 provides tools 446 for deploying those schemas as well as for extending those schemas.

A change tracking mechanism 406 implemented within the data store 402 provides the ability to track changes to the data store. The data store 402 also provides security capabilities 408 and a promotion/demotion capability 410. The data store 402 also provides a set of application programming interfaces 412 to expose the capabilities of the data store 402 to other storage platform 400 components and application programs (e.g., application programs 450a, 450b, and 450c) that utilize the storage platform 400.

The storage platform of the present invention still further comprises an application programming interface (API) 420, which enables application programs, such as application programs 450a, 450b, and 450c, to access all of the foregoing capabilities of the storage platform and to access the data described in the schemas. The storage platform API 422 may be used by application programs in combination with other APIs, such as the OLE DB API 424 and the MICROSOFT WINDOWS Win32 API 426.

The storage platform 400 of the present invention may provide a variety of services 428 to application programs, including a synchronization service 430 that facilitates the sharing of data among users or systems. For example, the synchronization service 430 may enable interoperability with other data stores 438 having the same format as data store 402, as well as access to data stores having other formats. The storage platform 400 also provides file system capabilities that allow interoperability of the data store 402 with existing file systems, such as the MICROSOFT WINDOWS NTFS file system 418. A SQL store 416 may also be provided.

In at least some embodiments, the storage platform 400 may also provide application programs with additional capabilities for enabling data to be acted upon and for enabling interaction with other systems. These capabilities may be embodied in the form of additional services 428, such as an Info Agent service 434 and a notification service 432, as well as in the form of other utilities 436.

In at least some embodiments, the storage platform 400 is embodied in, or forms an integral part of, the hardware/software interface system of a computer system. For example, and without limitation, the storage platform 400 of the present invention may be embodied in, or form an integral part of, an operating system, a virtual machine manager (VMM), a Common Language Runtime (CLR) or its functional equivalent, or a Java Virtual Machine (JVM) or its functional equivalent, or other such software components in the place of or in addition to the operating system in a computer system. The purpose of a hardware/software interface system is to provide an environment in which a user can execute application programs.

Through its common storage foundation, and schematized data, the storage platform 400 of the present invention enables more efficient application development for consumers, knowledge workers, and enterprises. It offers a rich and extensible programming surface area that not only makes available the capabilities inherent in its data model, but also embraces and extends the existing file system and database access methods.

In the description herein, and in various ones of the figures, the storage platform 400 of the present invention may be referred to as "WinFS." However, use of this name to refer to the storage platform 400 is solely for convenience of description and is not intended to be limiting in any way.

The data store 402 of the storage platform 400 of the present invention implements a data model that supports the organization, searching, sharing, synchronization, and security of data that resides in the store. The data model provides a mechanism for declaring objects and object extensions and for establishing relationships between objects and for organizing and categorizing objects.

The relational database engine 414, which in one embodiment comprises the Microsoft SQL Server engine, supports built-in scalar types. Built-in scalar types are "native" and "simple". They are native in the sense that the user cannot define their own types and they are simple in that they cannot encapsulate a complex structure. User-defined types ("UDTs") provide a mechanism for type extensibility above and beyond the native scalar type system by enabling users to extend the type system by defining complex, structured types. Once defined by a user, a UDT can be used anywhere in the type system that a built-in scalar type might be used.

The storage platform 400 schemas are mapped to UDT classes in the database engine store. Data store objects are mapped to UDT classes deriving from the Base.Item type. Extensions are also mapped to UDT classes and make use of inheritance. The root Extension type is Base.Extension, from which all Extension types are derived.

A UDT is a CLR class—it has state (i.e., data fields) and behavior (i.e., routines). UDTs are defined using any of the managed languages—C#, VB.NET, etc. UDT methods and operators can be invoked in T-SQL against an instance of that type. A UDT can be the type of a column in a row, the type of a parameter of a routine in T-SQL, or the type of a variable in T-SQL, for example.

Exemplary Embodiments

The present invention is directed to optimized constraint and index maintenance for Update commands or statements where the new value being assigned to the columns is actually the same as the current value, i.e., Update commands that actually leave the columns unchanged. An Update command is used in the description of the exemplary embodiments described herein, but it is contemplated that other types of data modification commands or statements may be used.

Figure 5:
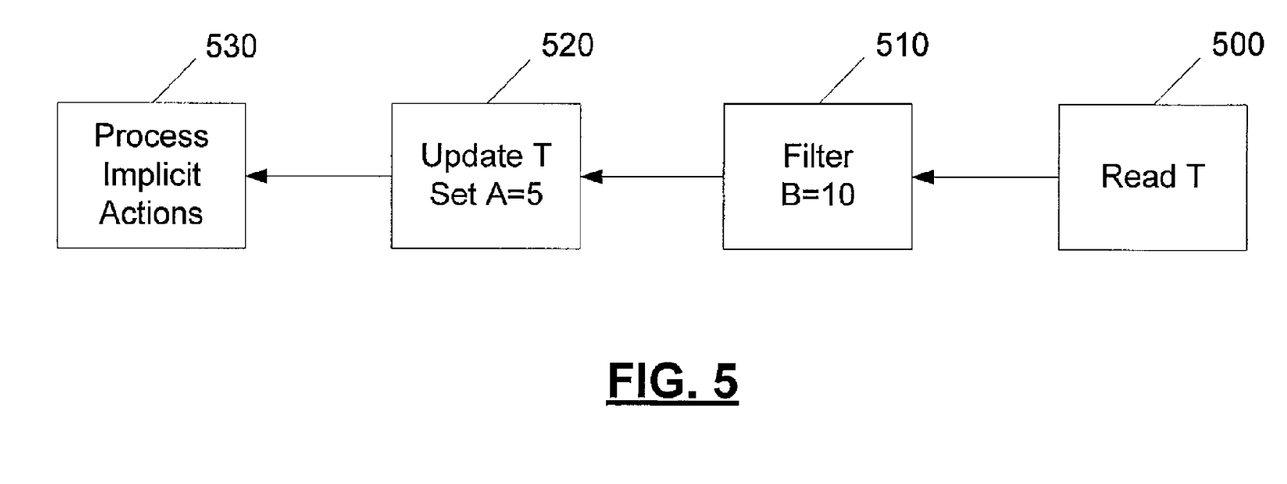
FIG. 5 is a flow diagram of an example that is useful in describing the present invention.

Database management systems (DBMS) allow modification of existing table rows through Update statements or other data modification commands. For example, a user may specify, via a command statement, the table to update (called the target table), the columns to modify and their respective new value(s), and qualify the rows to be updated through a Where clause, which is similar to that in a Select statement. An example of an Update statement is "Update T set A=5 Where B=10", which means that for each row in table T where column B is 10, column A has to be set to 5. A flow diagram of exemplary steps involved when receiving this statement in this example is shown in FIG. 5. At step 500, the table T is read. A filter is applied to the table at step 510 to determine which column B's are "10". At step 520, the column A's corresponding to the "10" column B's are "updated" to be set equal to "5".

The updating during step 520 uses an update query plan compiled by a query optimizer, described further below. The update query plan compiled by the query optimizer guarantees the preservation of data integrity after its execution. This is achieved by a proper instrumentation of the plan, with actions falling in two categories, either validating a constraint or maintaining a dependent data structure so that its content remains consistent with the target table. DBMSs allow redundant duplication of data in secondary data structures, to allow faster processing of certain categories of queries. Maintaining consistency between the base table and its dependent secondary structures allows subsequent data retrieval queries to receive the same results, independently from the data source that is chosen to implement the operation.

An Update statement can hence be seen as firing actions that were not explicitly described in the original syntax, but that are implicitly used in order to preserve data integrity. These actions are performed at step 530. Typical implicit actions are: secondary index maintenance; indexed view maintenance; check and referential integrity constraint validation; cascading actions; full text notifications; and query notifications. In SQL Server, the implicit update actions are desirably performed after modifying the base table and in appropriate order.

In order to identify the desired implicit actions to include in the update query plan, the SQL Server query optimizer enumerates the various kinds of objects that have a dependency on the table being updated. For each object, it is determined if the object is affected by the statement. If this is the case, the plan is modified to include appropriate operators guaranteeing that its execution does not cause data corruption for the object. An object is considered to be affected by the statement only if referencing one or more of the columns being updated.

Avoiding maintenance of objects that do not reference columns or other data structure fields being updated is a compile-time optimization that avoids processing operations guaranteed to be unnecessary by the syntax of the statement.

Such optimization is desirable in order to guarantee acceptable performance. The number of dependent objects can be very high, and some of the implicit actions used to maintain them can be extremely expensive.

If a dependent object references one or more columns being updated, the query plan desirably contains the operators to maintain the object. This could however lead to unnecessary operations at runtime, if all the columns are being assigned to their current value for one or more rows updated by the statement. Aspects of the present invention avoid such unnecessary operations with dynamic checks performed at query execution time, when static pruning is not possible or desirable at query optimization time. These dynamic optimizations can significantly improve application performance.

For example, just like a constraint over column A does not need to be validated if the update does not modify the column, the same is true if column A is being assigned to its current value. When processing the statement "Update T set A=5", for example, it is not necessary to perform any validation on the rows for which the value of A is 5 already. When a column is included in the assignment list of the update, it is not possible to determine at compile time for which rows the column value is going to change. Because data integrity at stake, the update plan desirably is conservative. During the runtime execution, it is however possible to determine on a row by row basis whether the column is being assigned to its current value or not, and in such a case, dynamically skip the unnecessary operations.

Figure 6:
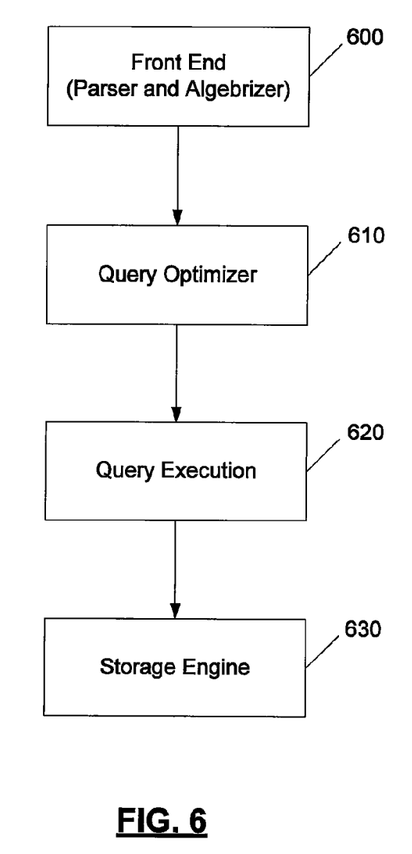
FIG. 6 is a block diagram of an exemplary system in accordance with the present invention.

Query processing in accordance with the present invention is implemented in the SQL Server DBMS through the interaction of the following exemplary components, as shown in FIG. 6: a front end (parser and algebrizer) 600, a query optimizer 610, a query execution component 620, and a storage engine 630. The front end 600 and query optimizer 610 perform at compile time, and the query execution component 620 and storage engine 630 perform during execution time.

A SQL command or data modification statement, such as Update, is received (e.g., as text from a user). The front end 600 receives the query statement in textual format, and converts it to a tree based representation describing at the logical level what the command is meant to do. In other words, a parser/algebrizer transforms the textual representation of the user's commands into tree nodes. The parser provides an update operator that internally represents the update statements functionally (semantically). The algebrizer provides TARGET TABLE, COLUMNS, NEW VALUES, TYPE OF UPDATE, for example.

The query optimizer 610 explores the possible alternative ways of implementing the query statement, trying to choose the most efficient. The query optimizer 610 produces another tree that represents, at the physical level, the plan to implement the query statement. A query optimizer generates the physical plan, by transforming the tree and finding the structural (physical) implementation that should be performed to implement the functionality. The optimizer determines the secondary indexes that are to be maintained (i.e., partial update index maintenance). The optimizer enumerates the dependencies on the TABLE (dependencies include indexed views and secondary indexes, for example). For each dependent object, the type of dependency is determined, along with what it is based on (e.g., based on a column(s) or an expression(s), based on a subfield of a UDT.) If the dependency is based on a UDT expression that extracts a subfield, then the syntax of the command is taken and it is determined if the dependent object is being affected by the update or not.

The query plan comprises appropriately interconnected query execution operators, which function by processing the rows they receive from their inputs, and passing the output of such processing to the operator that follows. The combination of the first two phases is called compilation, and its output—the query plan—is saved to memory to be reused in case the same query is issued again in the future. Techniques like substituting constants with logical parameters in the query statement allow more frequent reuse of the same plan.

The query execution component 620 executes the query plan generated by the query optimizer 610, interacting with the storage engine 630, which is the component that ultimately stores and retrieves the data. The query execution component receives subtrees for index maintenance from the optimizer, and executes the physical tree built by the query optimizer. Execution is performed by a storage engine to modify the data that is stored in the indexes, so that individual fields are updated.

Query execution plans for implementing Update statements in SQL Server are split in two phases. The first part is read only, and responsible for determining which rows are to be updated. The second part consumes the rows provided by the first, and performs the actual data modification.

It is contemplated that the invention can be used with any type of dependency and can be extended, among the others, to constraints over columns. Constraints may be user defined during table generation (e.g., zip code is 5 digits).

When processing a regular Update statement, the SQL Server query processor enumerates all the access paths dependent on the target table, extracts the list of columns used inside these dependent access paths, and verifies whether any of them is present in the assignment list. If this is the case, the content of the access path is considered to be changing, and the query execution plan is modified accordingly. For example, given a table T with columns (C1, C2, C3), and an index over C1+C2, an update of the form "Update T Set C1=2", will result in a query execution plan that propagates the changes to the index. The plan for the statement "Update T Set C3=10" will instead leave the index untouched, resulting in better performance at runtime.

Thus, database management systems allow modifying the content of user tables via Update statements. The Update statement syntax allows assigning new values to table columns. Update statement processing is desired to preserve data integrity, by maintaining constraints and indexes dependent on the table.

Optimized constraint and index maintenance is performed for Update statements where the new value being assigned to the columns is actually the same as the current, i.e., Update statements that actually leave the columns unchanged. Without the optimization, a database management system like SQL Server would have poor performance when processing Update statements that do not actually change some or all of the column values. Non-updating updates are a frequent scenario in customer applications.

Exemplary runtime optimization is achieved by the SQL Server query processor by including appropriate filters inside the update plan. These filters prevent, on a row by row basis, the execution of implicit actions that maintain a dependent object, if none of the columns involved are being updated with a value that is actually being changed. These runtime filters are desirably introduced in the plan after having statically pruned out objects that are not affected by the update. The filters are per dependent object, being based on the columns it references.

Figure 7:
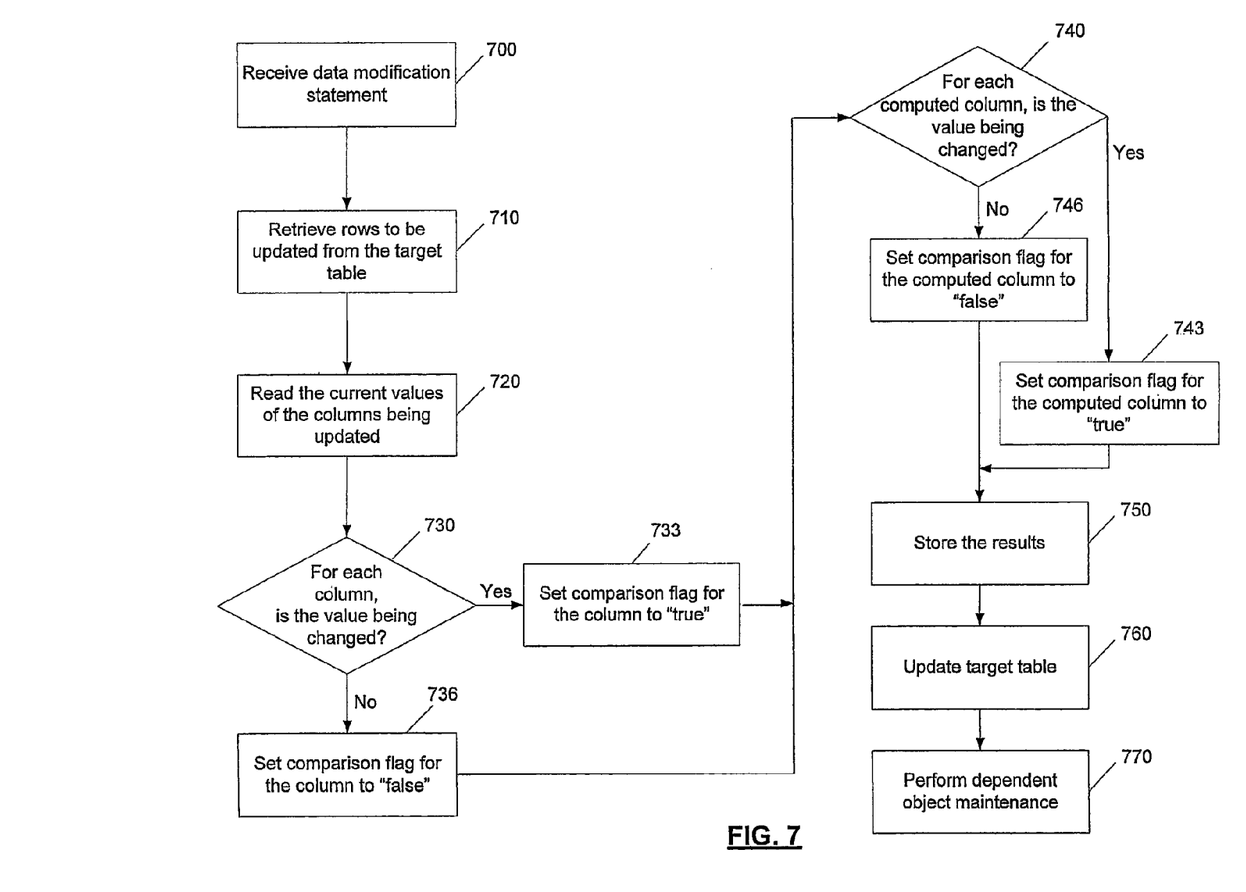
FIG. 7 shows a flow diagram of an exemplary method of processing a data modification statement in accordance with the present invention.
Figure 8:
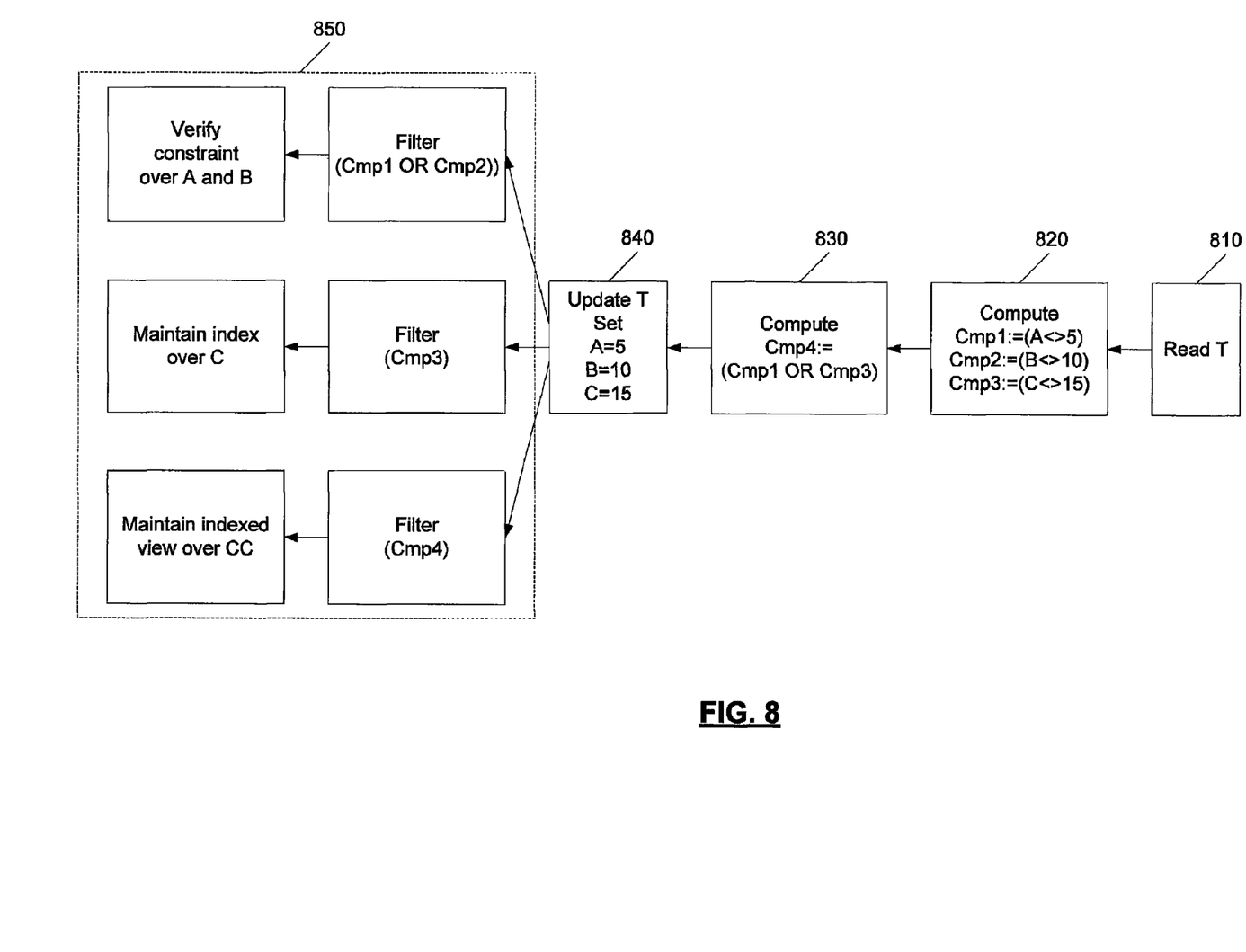
FIG. 8 is a diagram corresponding to an exemplary method of processing a data modification statement in accordance with the present invention.

FIG. 7 shows a flow diagram of an exemplary method of processing a data modification statement in accordance with the present invention, and FIG. 8 shows a diagram of a corresponding example. The filters are desirably introduced by the query optimizer in the query plan pursuant to the process described with respect to FIG. 7.

At step 700, a data modification statement, such as an Update statement, is received. For example, the data modification statement "Update T Set A=5, B=10, C=15" may be received. This command directs columns A, B, and C to be set to values 5, 10, and 15, respectively, in base table T.

For each column being updated and referenced by a constraint or dependent object, an expression evaluation is added to the query plan, to compare the column with the value it is being assigned to. The comparison expressions are desirably added to the plan in a way such that they will be evaluated after locating the base table row to be updated, and right before performing the update. Given the update model used in SQL Server, for example, this is a very convenient and efficient way to compare, because both the current and new values of the columns are naturally available, and no extra overhead is necessary to materialize either. The results of the comparison are desirably saved so that they will be available when performing constraint validation and dependent object maintenance, as these are desirably placed in the query plan above the base table update. This scheme could however be easily changed to match other update mechanisms used by other query processors.

At step 710, the rows to be updated are retrieved from the target table (810 in FIG. 8), and at step 720, the current values of the columns being updated are read. Thus, using the example, the base table T is retrieved, and the current values of columns A, B, and C in table T are retrieved.

The current value of each column is compared, at step 730, to the new value that is provided by the Update statement. This comparison is made to determine which column(s), if any, is affected by the update. Each column that is a candidate for updating has a comparison flag that is set in accordance with the results of the comparison. At step 733, the comparison flag is set to "true" if the column is to be updated with a new, different value. Otherwise, at step 736, the comparison flag is set to "false" if the column is not being updated with a new, different value (i.e., the column is being subject to a non-updating update). For example, if the current value of column A is 6 and the Update statement changes the value to 5, then the comparison flag ("Cmp1") for column A will indicate that column A is to be updated. Moreover, if the current value of column B is 10 and the Update statement "changes" the value to 10, then the comparison flag ("Cmp2") for column B will indicate that column B is not to be updated (i.e., column B is subject to a non-updating update).

Thus, the runtime filters are defined as a disjunction of the results of the comparisons for the columns involved and being updated. This means that the action will be executed if any of the referenced columns is changing. For example, if processing the statement that sets three variables to constants "Update T Set A=5, B=10, C=15", three comparison expressions will be derived: Cmp1:=(A< >5), Cmp2:=(B< >10), Cmp3:=(C< >15) (820). At runtime, a constraint over A and B, for example, will be evaluated only if either Cmp1 or Cmp2 is true. An index over C, for example, will be maintained only if Cmp3 is true.

Computed column comparison is then performed, at step 740, desirably before the update, to determine if any computed columns are affected by the update. At step 743, a comparison flag for the computed column is set to "true" if the computed column is to be updated with a new, different value. Otherwise, at step 746, the comparison flag is set to "false" if the computed column is not being updated with a new, different value (i.e., the computed column is being subject to a non-updating update).

In particular, if an object references a computed column, its comparison expression will be built as a disjunction of the columns it is defined on and that are being updated. For example, if computed column CC is defined as A+C+D, because D is not being updated, its comparison expression (Cmp4) will be defined the disjunction of the comparison results for A and C: Cmp4:=(Cmp1 OR Cmp3) (830). Thus, if CC=A+C+D, it is determined which of A, C, and D, if any, is being modified. If any are being modified, then CC will be modified.

The evaluation of the comparisons is performed before the base table update, and the consumption of the results occurs after. Thus, the results are saved to a temporary location, at step 750, or otherwise stored. Because the results of the evaluation are desirably Boolean binary values, the overhead is very little. It is noted that normally database engines delay execution of a scalar expression until the moment when the result is used, to improve performance. This is not desirable here, because the expression is desirably evaluated before the update (so the pre-update values are used), and its result is consumed later. Thus, it is desirable to save the result to a temporary location.

At step 760, the target table is updated pursuant to those columns that were determined to be changed (i.e., those columns that were being changed by the Update statement and not subject to non-updating updates) using the saved results (840).

Dependent object maintenance is then performed, at step 770 (850). For example, constraints are verified, and indexes and indexed views are maintained, using filters on the comparison flags. For example, if a constraint over columns A and B is in place, then this constraint is verified by determining if the Cmp1 (the comparison flag corresponding to column A) or Cmp2 (the comparison flag corresponding to column B) is true, by filtering (Cmp1 OR Cmp2). If an index is to be maintained over column C, for example, then Cmp3 (the comparison flag corresponding to column C) is filtered. If an indexed view is to be maintained over the computed column CC, for example, then Cmp4 (the comparison flag corresponding to computed column CC) is filtered.

Thus, to avoid unnecessary implicit actions when the column values are not changing, comparisons are performed at runtime between the current and new value. Such comparisons introduce an overhead that is useless in case the new value is different, because the implicit action will have to be executed anyway.

A scenario where non-updating updates are typical is with client applications that load table rows and through some user interface allow changes to be made to it. It can be hard for the application to keep track of all the changes made by the user or triggered by processing business logic, and as a result it is typical to have update statements that simply assign all the columns to the values that are currently set in the client buffer. It is however common that only a minority of the columns is actually assigned to a different value.

Using update statements that assign all the columns is also a way for the client application to avoid building dynamic, ad-hoc SQL strings. Without runtime optimizations, a choice must be made between using precompiled query statements that assign all the columns, and hence can cause unnecessary implicit actions, versus ad hoc query strings that assign only the very columns that changed, which can easily result in numerous compilations and significant overhead. Runtime optimizations remove this tradeoff, allowing efficient execution of precompiled update statements.

Object oriented relational database management systems (ORDBMS) allow defining custom datatypes representing complex objects. WinFS is an example of such ORDBMS, supporting type inheritance. A table column can represent a complex object containing a set of subfields depending on its type. Subfields can in turn be complex objects themselves. For example, a column of Employee type will have (Name, Age, Address, Salary, Department, HireDate) subfields. Its Address subfield will in turn have different subfields according to its type.

WinFS allows building secondary indexes and indexed views referencing subfields of complex table columns, to allow efficient processing of queries that represent searches based on object properties, such as, for example, "Find all the students whose GPA is greater than 3".

A mechanism like the Serialization Library (SL) allows accessing and modifying individual subfields of complex objects with performances comparable to regular columns. The SL allows efficient modification of individual subfields of complex columns through appropriate extensions to the update statement syntax, as opposed to requiring users to overwrite the entire object with the new value. Since the SL elevates performance-wise column subfields to regular columns, it is desirable to make the runtime optimization available for subfields as well, because they can be used to build secondary indexes and indexed views.

Even if granular subfield updates are made available, overwriting complex columns with an entirely new value is still an available option. Without any runtime optimization, processing such an operation will desirably perform updating all the entries pertinent to the object from all the secondary structures that reference its subfields. This operation could potentially be very expensive, and perform many unnecessary tasks if some or most of the subfields are not really changed, which can happen frequently when the object is fully overwritten with a new value. An example is a client application loading a complex object, losing track of the changes made to it, and finally overwriting the entire object with an update statement.

Another example, specific to WinFS, is when overwriting a file with a new one. WinFS will store in a database table an object representing the file properties, and the overwrite operation at the file system level will trigger overwriting the object in the ORDBMS. If the new file shares some or many of the properties with the old, unnecessary secondary data structure maintenance operations will be avoided with the runtime optimization.

Additional techniques may be used to further minimize the overhead introduced for implementing the runtime filters. These techniques desirably do not negatively affect scenarios where the implicit actions are necessary or desirable.

An exemplary technique performs comparisons between the current and new value only if the column is being updated and referenced in some constraint or dependent data structure. If a column is known not to be changing at compile time, static pruning techniques are instead used.

Moreover, the comparison may occur after locating the row to be updated, and does not introduce any data access overhead that would otherwise be required if more reads were necessary.

Typically, columns referenced in dependent objects are very small in size, as users try to avoid the significant overhead that would be caused by storing a bigger column in a secondary data structure or referencing it in a constraint. In SQL Server, for example, index keys cannot be bigger than about 900 bytes, and in the most typical scenarios the actual size is much smaller. Moreover, according to aspects of the invention, binary comparison is performed between the old and the new values, which is very efficient.

Comparisons for large objects (LOBs) are desirably avoided. The overhead this would introduce would be too high to justify the optimization. Also, application developers are usually aware that LOB operations can be extremely slow due to the sometimes huge column sizes, and typically when the developers issue updates against these columns, the developers realize the implications and intend the operations.

The SQL Server query optimizer is desirably able to derive equality and inequality properties for columns in a query. This can be used in some situations to infer whether a column is guaranteed to change or not, and avoid useless comparisons. For example, if a column is assigned to itself ("Update T Set A=A"), then it is guaranteed it will never change. Another example is when a column is assigned to itself plus 1 ("Update T Set A=A+1"). In this case, the new value will always be different.

The query optimizer desirably can evaluate statistical information about the data distribution of the columns being updated, and estimate the likelihood that the new value is the same as the current value. For example, if statistics exist on column A of table T, and according to these the value 5 is extremely frequent, it can be guessed that an update statement in the form "Update T Set A=5" will leave the value unchanged.

The query optimizer can evaluate the cost of comparing values versus executing the implicit action, and take into account statistical information about the selectivity of the runtime filters gathered during query execution. This allows making a cost based decision on whether it is worth introducing the runtime optimization or not.

If the implicit action does not involve data access or some other kind of expensive operation, its execution cost will be similar to comparing two values, and the runtime optimization can be avoided. For example, validating a scalar constraint like (A>B+C) is an operation not expensive enough to justify the runtime optimization. Similarly, if by analyzing statistical information gathered at runtime, it is determined that the runtime filters tend to avoid only a small minority of the implicit actions, the optimizations can be disabled as not satisfactory given the current workload.

A typical implicit action for an Update statement is maintaining a secondary index. In such a case, the overall execution cost is proportional to the total number of access paths (base table and secondary indexes) to maintain. Without runtime optimization, an Update statement that assigns all the columns in the table will have to maintain all the secondary indexes. Thus, for example, if only half of the columns are being really changed, the optimization will roughly halve the execution time.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed is:

1. A method of processing a data modification statement, comprising:
   receiving a data modification statement;
   determining which fields of a base data structure are affected by the data modification statement;
   designating which fields of the base data structure have a current value that would change as a result of executing the data modification statement and which fields of the base data structure that would not change as a result of executing the data modification statement, wherein executing the data modification statement for fields of the base data structure that would not change is a non-updating update;
   determining which fields of a dependent data structure depend on the fields of the base data structure that have a current value that would change as a result of executing the data modification statement, wherein a field of the dependent data structure depends on a field of the base data structure if a constraint over the field of the dependent data structure references one or more of the fields of the base data structure;
   identifying whether the dependent fields of the dependent data structure have a current value that would change as a result of executing the data modification statement;
   designating indicators for the fields of the dependent data structure that depend on the fields of the base data structure that have a current value that would change as a result of executing the data modification statement,
   generating an update query plan that identifies the dependent fields and the designated indicators for the fields of the dependent data structure that depend on the fields of the base data structure that have a current value that would change as a result of executing the data modification statement; and
   during runtime execution of the data modification statement, in accordance with the update query plan, updating the base data structure and dependent data structure in accordance with the indicators in the update query plan to filter out the execution of non-updating updates.

2. The method of claim 1, wherein the data modification statement comprises an update command.

3. The method of claim 1, wherein the data structure comprises a base table.

4. The method of claim 1, wherein the data structure comprises one of a computed column, an indexed view, and an index.

5. The method of claim 1, wherein the fields comprise columns of a base table.

6. The method of claim 1, wherein the fields comprise stored objects.

7. The method of claim 1, further comprising performing dependent object maintenance after updating the data structure.

8. The method of claim 7, wherein the dependent object comprises one of a constraint, an indexed view, and an index.

9. The method of claim 7, wherein performing dependent object maintenance comprises at least one of verifying a constraint, maintaining an index, and maintaining an indexed view.

10. The method of claim 1, wherein designating indicators comprises setting a flag for each field, each flag indicating whether the current value in the field would change as a result of executing the data modification statement.

11. The method of claim 1, wherein determining which fields of the structure are affected by the data modification statement comprises determining whether a computed column is affected by the data modification statement.

12. The method of claim 11, further comprising setting a flag for the computed column indicating whether the computed column is affected by the data modification statement.

13. A computer-implemented system for processing a data modification statement, comprising:
   at least one processor having a front end that receives a data modification statement; and
   a computing memory communicatively coupled to the processor;
   a query optimizer executed by said processor that:
   fields determining which fields of a base data structure that indicate if a current value in each of the fields would change as a result of executing the data modification statement and which fields of the base data structure that would not change as a result of executing the data modification statement, wherein executing the data modification statement for fields of the base data structure that would not change is a non-updating update,
   determines which fields of a dependent data structure depend on the fields of the base data structure that have a current value that would change as a result of executing the data modification statement, wherein a field of the dependent data structure depends on a field of the base data structure if a constraint over the field of the dependent data structure references one or more of the fields of the base data structure;
   identifies whether the dependent fields of the dependent data structure have a current value that would change as a result of executing the data modification statement;
   designates indicators for the fields of the dependent data structure that depend on the fields of the base data structure that have a current value that would change as a result of executing the data modification statement,
   generates an update query plan that identifies the dependent fields and the designated indicators for the fields of the dependent data structure that depend on the fields of the base data structure that have a current value that would change as a result of executing the data modification statement, where said indicators are stored in the computing memory; and a query execution component executed by said processor that executes the data modification statement, in accordance with the update query plan, and updates the base data structure and the dependent data structure in response to the fields of the base data structure that are changed by the data modification statement by checking the indicators of the update query plan during runtime execution, preventing the execution of non-updating updates.

14. The system of claim 13, wherein the data modification statement comprises an update command.

15. The system of claim 13, wherein the data structure comprises a base table.

16. The system of claim 13, wherein the data structure comprises one of a computed column, an indexed view, and an index.

17. The system of claim 13, wherein the fields comprise columns of a base table.

18. The system of claim 13, wherein the fields comprise stored objects.

19. The system of claim 13, wherein the query optimizer is adapted to perform dependent object maintenance after updating the data structure.

20. The system of claim 19, wherein the dependent object comprises one of a constraint, an indexed view, and an index.

21. The system of claim 19, wherein the dependent object maintenance comprises at least one of verifying a constraint, maintaining an index, and maintaining an indexed view.

22. The system of claim 13, wherein the query optimizer sets a flag as the indicator for each field, each flag indicating whether the current value in the field would change as a result of executing the data modification statement.

23. The system of claim 13, wherein the query optimizer determines which fields of the data structure are affected by the data modification statement by determining whether a computed column is changed by the data modification statement.

24. The system of claim 23, wherein the query optimizer sets a flag for the computed column indicating whether the computed column is affected by the data modification statement.

25. A computer-readable storage medium having stored thereon a data structure, comprising:

a first data field containing a data modification statement; and a second data field containing fields of a base data structure that are affected by processing the data modification statement; and a third data field containing the affected fields that indicate if a current value in each of the fields would change as a result of executing the data modification statement and for the affected fields of the base data structure that would not change as a result of executing the data modification statement, wherein executing the data modification statement for fields of the data structure that would not change is a non-updating update;

a fourth data field containing indicators for the fields of a dependent data structure that depend on the fields of the base data structure that have a current value that would change as a result of executing the data modification statement, wherein a field of the dependent data structure depends on a field of the base data structure if a constraint over the field of the dependent data structure references one or more of the fields of the base data structure;

wherein the indicators are used to update the data structure in response to the fields of the data structure that are changed by the data modification statement by checking the indicators and the indicators are used to prevent the execution of non-updating updates.

26. The computer-readable storage medium of claim 25, wherein the data modification statement comprises an update command.

27. The computer-readable storage medium of claim 25, wherein the fields comprise columns of a base table.

28. The computer-readable storage medium of claim 25, wherein the fields comprise stored objects.

29. The computer-readable storage medium of claim 25, further comprising an additional data field containing a query plan modified in response to the third data field.

* * * * *